W. RUPPERT.
LATHE ACCESSORY.
APPLICATION FILED NOV. 22, 1911.

1,033,943.

Patented July 30, 1912.

Witnesses:

Inventor:
Wilhelm Ruppert

UNITED STATES PATENT OFFICE.

WILHELM RUPPERT, OF PORZ-ON-THE-RHINE, GERMANY.

LATHE ACCESSORY.

1,033,943.  Specification of Letters Patent.  Patented July 30, 1912.

Application filed November 22, 1911. Serial No. 661,838.

*To all whom it may concern:*

Be it known that I, WILHELM RUPPERT, a citizen of the Empire of Germany, residing at Porz-on-the-Rhine, in the Empire of Germany, have invented a new and useful Lathe Accessory, of which the following is a specification With ordinary screw-cutting lathes possessing a leading feed screw and a two-part sliding nut attached to the saddle it is after cutting the first chip in forming the thread always necessary to first withdraw the cutting tool from the work-piece, then to open the sliding nut for releasing the feed screw and to stop the lathe, afterward to rapidly return the saddle to about its initial position and next to carefully adjust the saddle so as to make sure, that the tool again engages in the work-piece exactly on the correct place and does not strike the material on a wrong place. Only after the readjustment of the saddle the lathe is restarted for cutting the second chip, after which the same series of operation is repeated, until the work is finished. The repeated stopping of the lathe is, however, objectionable, as thereby a good deal of time is lost. Only very skilled workmen are able to perform the operation satisfactorily without stopping the lathe My invention relates to a simple accessory, which can be attached to any ordinary lathe having a feed screw without any further alterations and will enable any unskilled workman to disengage and reëngage the saddle easily and correctly without stopping the lathe.

I will now proceed to describe my invention with reference to the accompanying drawing, in which—

Figure 1:
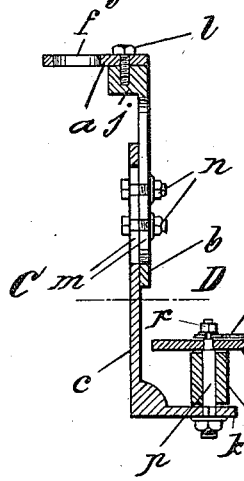
Figures 2, 4:
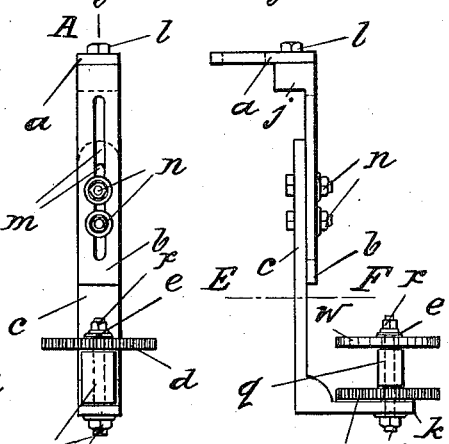
Figure 3:
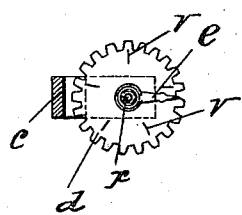
Figure 5:
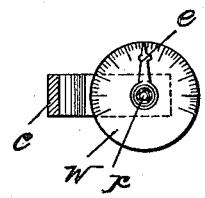
Figure 6:
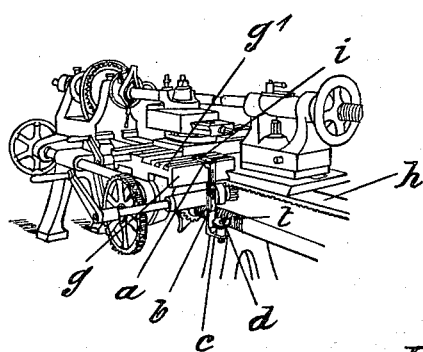

Figure 1 is a vertical longitudinal section through an accessory on the line A—B in Fig. 2. Fig. 2 is an elevation of the same, Fig. 3 is a horizontal section through the line C—D in Fig. 1, Fig. 4 is a side view of a modified accessory, Fig. 5 is a horizontal section through the line E—F in Fig. 4, and Fig. 6 is a perspective view of a screw-cutting lathe provided with the accessory shown at Figs. 1 to 3.

Similar letters of reference refer to similar parts throughout the several views.

The new accessory essentially comprises a support and a gear wheel. The support consists of an upper horizontal plate $a$ and two vertically slotted parts $b$ and $c$. The upper plate $a$ is connected with the upper part $b$ by means of a screw $l$ engaging in the lug $j$ and can be turned and displaced with regard to the part $b$. The two parts $b$ and $c$ can be longitudinally displaced with regard to one another and connected together by means of two bolts $n$ and nuts which pass through the longitudinal slots $m$ of the two parts. A vertical preferably exchangeable pin $p$ is secured with its lower end in the arm $k$ of the lower part $c$ and on this pin a cylinder $q$ is made to turn. An exchangeable gear wheel $d$ can be connected with the cylinder $q$ and in any known manner be prevented from turning on the cylinder, for example by means of a small pin. Above the gear wheel $d$ an indicator $e$ is put on, which can be prevented from turning on the pin $p$ in any known manner, for example by means of a nut $r$ engaging in the upper threaded end of the pin. The gear wheel $d$ is provided on its upper surface with several radial lines $v$ $v$, over which the indicator $e$ passes during the rotation of the gear wheel $d$.

The upper plate $a$ is provided with a slot $f$ and can be fastened on the upper surface of the saddle $g$ (Fig. 6) of any screw-cutting lathe $h$ by means of a bolt $i$ engaging with its head in a dovetail-groove $g^1$ of the saddle and passing through the slot $f$. The two parts $b$ and $c$ of the support can be displaced with regard to one another and so adjusted as to bring the gear wheel $d$ into the horizontal central plane of the feed screw $t$. The pitch of the gear wheel $d$ requires to be equal to that of the feed screw $t$, so that the gear wheel can mesh with the feed screw. The size of the gear wheel and consequently its number of teeth is immaterial, but for practical reasons it is advisable to make the gear wheel neither too large nor too small in diameter. When assuming the feed screw to have an integral number, say two, three, four or five, of turns to the inch and the gear wheel $d$ to have sixty teeth, this number can be divided by any of the above numbers of turns without a remainder. As however, for a feed screw having two or three turns to the inch the gear wheel $d$ having sixty teeth would be too large for use, it is advisable to employ two gear wheels having 24 and 60 teeth for the accessory, the gear wheel having 24 teeth being used for feed screws with two or three turns to the inch and the gear wheel having 60 teeth for feed screws with four, five or six turns to the inch. On the gear wheel having 24 teeth every second or third next tooth and on the gear wheel having 60 teeth every fourth or fifth or sixth next tooth is marked with a radial line $v$.

In case the feed screw is made to the metric scale, the number of teeth of the gear wheel $d$ does not matter much. In such cases the gear wheel $d$ is connected with the lower end of the cylinder $q$, as is shown at Figs. 4 and 5, while the upper end of the cylinder $q$ is rigidly connected with a disk $w$, which on its upper surface is provided with a millimetric scale. Then certain of the division lines of this scale are specially marked, as is for example shown in Fig. 5. Preferably the disk $w$ is provided in its central hole with a pin adapted to engage in a recess of the cylinder $q$, so that in this manner the disk is obliged to partake in the revolution of the gear wheel $d$ and can be exchanged for another one.

When commencing with the screw-cutting, the indicator $e$ is first placed over any of the radial lines $v$ in the case of Figs. 1 to 3 or over any of the marked division lines in the case of Figs. 4 and 5. During the forward motion of the saddle $g$ along the lathe bed the gear wheel will remain immovable, but when at the end of the stroke the sliding nut is opened, so that the saddle $g$ stops and the feed screw $t$ continues turning, of course by reason of the gear wheel meshing with the feed screw the former will be set to slowly rotate, so that the respective radial line $v$ or marked division line leaves the indicator $e$. When now the saddle is rapidly returned to approximately its initial position without stopping the lathe, the gear wheel being rotated more quickly, it will be easy even for the unskilled workman to effect the correct reëngagement of the saddle with the feed screw. It is only necessary for him to watch the slowly revolving gear wheel and to wait for the moment at which the indicator $e$ is about to cover one radial line $v$ or marked division line, then to at once close the sliding nut and at the same time to move the tool forward by means of the cross slide, when the point of the tool will strike the work-piece exactly on the right place.

In case the number of teeth of the gear wheel, for example 24, can be divided without a remainder by the number of thread turns to the inch of the feed screw, for example two, three or four, it is unnecessary to wait for the moment at which the indicator $e$ covers a certain one of the several radial lines $v$, but the indicator may cover any of them.

I claim:

1. In a screw-cutting lathe having a feed screw, the combination with a slotted plate adapted to be adjusted on the saddle, a pendent post connected with said plate and having a vertical slot, a vertically slotted support, bolts passing through the slots of said post and said support for connecting together these parts, said support having a horizontal arm, a vertical pin secured in said arm, a gear wheel turnable on said pin and adapted to mesh with the feed screw and provided on its upper surface with division lines, and an indicator fastened on said pin above the division lines of said gear wheel.

2. In a screw-cutting lathe having a feed screw, the combination with a slotted plate adapted to be fastened on the saddle, a pendent post connected with said plate and having a vertical slot, a vertically slotted support, bolts passing through the slots of said post and said support for connecting together these parts, said support having a horizontal arm, a vertical pin secured in said arm, a gear wheel turnable on said pin and adapted to mesh with the feed screw, a disk above said gear wheel and connected therewith and having on its upper surface division lines, and an indicator fastened on said pin above the division lines of said disk.

WILHELM RUPPERT.

Witnesses:
 JOSEPH STODTEN,
 CARL SIEGREN.